(No Model.)
H. A. COATS.
APPARATUS FOR COOKING STARCH.
No. 374,346. Patented Dec. 6, 1887.
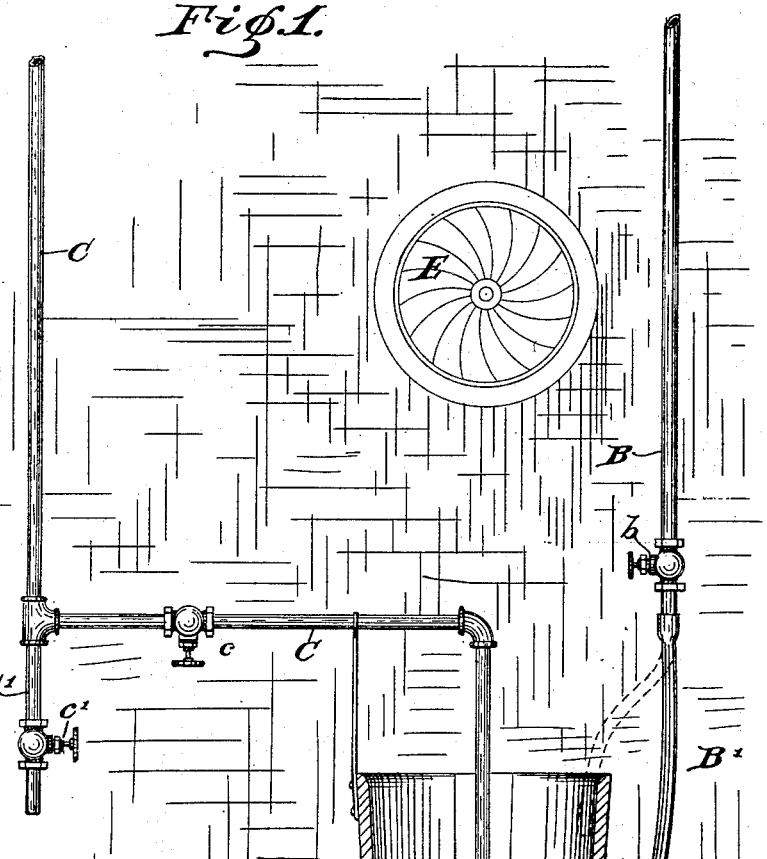
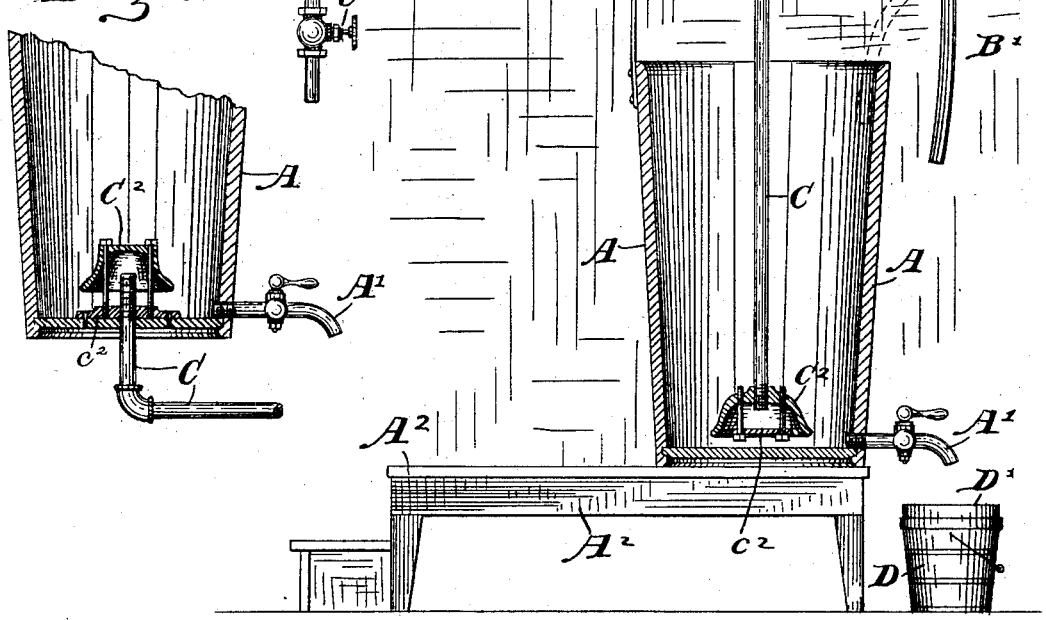
WITNESSES.
Chas. N. Leonard,
Charles L. Thurber.
INVENTOR.
H. A. Coats,
PER
C. Bradford,
ATTORNEY.
N. PETERS, Photo-Lithographer, Washington, D. C.

UNITED STATES PATENT OFFICE.

HARRY A. COATS, OF NEWARK, NEW JERSEY.

APPARATUS FOR COOKING STARCH.

SPECIFICATION forming part of Letters Patent No. 374,346, dated December 6, 1887.

Application filed June 14, 1887. Serial No. 241,264. (No model.)

*To all whom it may concern:*

Be it known that I, HARRY A. COATS, of the city of Newark, county of Essex, and State of New Jersey, have invented certain new and useful Improvements in Apparatus for Cooking Starch, of which the following is a specification.

My invention relates to the preparation of starch for use in considerable quantities, and is adapted to be employed in factories, bleacheries, feather-dyeing establishments, paper-mills, laundries, &c., where it is desirable not only that the starch should be speedily prepared, but that it should be uniformly of the right consistency for the work desired.

The invention consists in providing a tank in connection with a certain arrangement of steam and water pipes, and in certain details of construction, all as will be hereinafter more particularly described and claimed.

Referring to the accompanying drawings, which are made a part hereof, and on which similar letters of reference indicate similar parts, Figure 1 shows a tank in central vertical section, the remaining portions of the apparatus and its surroundings being shown in elevation; and Fig. 2 is a view similar to a portion of Fig. 1, except that the steam-pipe enters the tank at the bottom instead of the top.

In said drawings, the portions marked A represent the tank; B, a water-pipe; C, a steam-pipe; D, a vessel for receiving the perpared starch, and E a fan.

The tank A may be of any construction desired. It is shown as a wooden vessel similar to a water-tank; but it may be made of metal, if desired. When made of metal, it should be brass, copper, galvanized iron, or some other metal which will not rust, and the portion of the pipe C which enters the tank should be of a similar metal. At the bottom, on one side, said tank is provided with a faucet, A', through which the cooked starch may be drawn off into a suitable vessel. This tank may be provided with a cover; but such cover when used should not completely shut the tank, as it is necessary to permit the steam used in cooking to escape after having passed up through the starch, and therefore some sort of an opening is necessary. The tank, as a whole, is preferably mounted on a raised platform, A², for convenience, as shown.

The water-pipe B is shown as a convenient way of introducing into the tank the water which is necessary to wet the starch before cooking; but of course water may be brought to the tank in any other way desired. This pipe when used should, for convenience, have a flexible portion or hose, B', attached to its lower end, which may be directed to discharge into the tank, as indicated by the dotted lines, or otherwise, at the pleasure of the operator. A cock or valve, $b$, is shown, by which the flow of water may be controlled.

The steam-pipe C leads from wherever the steam is generated to the interior of the tank A, and the portion which enters said tank should, as before stated, be of some metal which will not rust or easily corrode, as otherwise the starch might become discolored and impaired. The steam is controlled by the cock or valve $c$. A drip-pipe, C', containing a cock or valve, $c'$, should be provided, (preferably at an angle, as shown,) through which condensation may be drawn off before the steam is turned on for cooking purposes.

Secured to the end of the pipe C, inside the tank, is a device, C², by which the steam is deflected from a straight course and distributed throughout the starch, instead of being all delivered at one point, as would otherwise be the case. This device C² is substantially bell-shaped, with the pipe passing through the top of the bell, and should be provided with a plate, $c^2$, which may be hung thereto by bolts, as in the construction shown in Fig. 1, or secured directly to the bottom of the tank, as in the construction shown in Fig. 2. This plate may, by means of said bolts, be adjusted nearer to or farther from the bell-shaped device, as desired, and thus the steam deflected more or less, as may at the time seem preferable.

The vessel D for receiving the starch may be any suitable vessel desired; but it should always be provided with a fine sieve or strainer to strain the starch and remove any impurities. This is shown as a strainer, D', sitting on the top of the vessel which is arranged underneath the faucet A'.

The fan E is preferably located in the wall of the building above the tank A, and should be of such a character that the steam rising from the tank during the process of cooking will be drawn through said fan and discharged to the outside. It may be of any construction desired and operated by any preferred means.

In the use of this invention due regard must of course be had to the purpose for which the starch is to be employed, but after the proper consistency has once been secured care should be taken in mixing other batches of starch to put in exactly the same quantity of water relatively to the quantity of dry starch in every case. Before turning on the steam the condensation in the pipe should always be drawn off, thus avoiding weakening the starch or discoloring it. The steam when turned on should be at least forty-five pounds pressure, and so kept, and should be kept turned on for a full hour after the starch begins to boil.

The even and thorough cooking which results from the use of my apparatus and method as above described produces a clear starch of the best quality to efficiently stiffen the fabric to which it is applied, so that it will thus remain. Especially in laundry-work a durable, soft, and elastic finish is produced, which will not soften during the heated season, but remain in good condition with a fine gloss.

Having thus fully described my said invention, what I claim as new, and desire to secure by Letters Patent, is—

1. The combination, in a starch-cooking apparatus, of a tank, a steam-pipe arranged to discharge into said tank near its bottom, and a steam-distributing device arranged just above the point of discharge, substantially as shown and described.

2. In a starch-cooking apparatus, in combination with the tank and steam-pipe forming part thereof, a steam-distributing device attached to the open end of said pipe, consisting of a bell or inverted cup-shaped part surrounding the end of the pipe, and a plate or deflector below the end of said pipe, as set forth.

In witness whereof I have hereunto set my hand and seal, at Boston, Massachusetts, this 4th day of June, A. D. 1887.

HARRY A. COATS. [L. S.]

In presence of—
AUSTIN H. EATON,
GEORGE O. GIBBS.